United States Patent
Bosarge et al.

(10) Patent No.: US 10,860,674 B2
(45) Date of Patent: Dec. 8, 2020

(54) PAGE COMPETE

(71) Applicant: CAKE TECHNOLOGIES, INC., South Jordan, UT (US)

(72) Inventors: Jason Bosarge, South Jordan, UT (US); D. Levi King, San Mateo, CA (US)

(73) Assignee: CAKE TECHNOLOGIES, INC., South Jordan, UT (US)

( * ) Notice: Subject to any disclaimer, the term of this patent is extended or adjusted under 35 U.S.C. 154(b) by 233 days.

(21) Appl. No.: 16/044,820

(22) Filed: Jul. 25, 2018

(65) Prior Publication Data

US 2019/0034531 A1 Jan. 31, 2019

Related U.S. Application Data

(60) Provisional application No. 62/536,851, filed on Jul. 25, 2017, provisional application No. 62/574,058, (Continued)

(51) Int. Cl.
*G06F 16/957* (2019.01)
*G06F 16/951* (2019.01)
(Continued)

(52) U.S. Cl.
CPC .......... *G06F 16/9574* (2019.01); *G06F 3/017* (2013.01); *G06F 3/0482* (2013.01); *G06F 3/0488* (2013.01); *G06F 16/313* (2019.01); *G06F 16/316* (2019.01); *G06F 16/9038* (2019.01); *G06F 16/90324* (2019.01); *G06F 16/951* (2019.01); *G06F 16/955* (2019.01); *G06F 16/9535* (2019.01); *G06F 16/9538* (2019.01); *G06F 16/9566* (2019.01);
(Continued)

(58) Field of Classification Search
CPC ..... G06F 16/9538; G06F 16/953; G06F 16/90
See application file for complete search history.

(56) References Cited

U.S. PATENT DOCUMENTS 8,060,634 B1 11/2011 Darnell et al.
9,235,429 B1 1/2016 Sharifi Mehr
(Continued)

OTHER PUBLICATIONS

Hoffman, How Website Speed Actually Impacts Search Ranking, https://moz.com/blog/how-website-speed-actually-impacts-search-ranking (Year: 2013).*

(Continued)

*Primary Examiner* — William Spieler
(74) *Attorney, Agent, or Firm* — Workman Nydegger

(57) ABSTRACT

Optimizations are provided for generating a list of search results. At a user interface, a query is received from a user who is using the user interface. This query includes a request to access digital content. In response to the request, a set of query results is obtained. This set of query results includes a first list of selectable links. Each of these links is associated with the digital content requested by the query and is prioritized according to a particular order. Then, an access performance rate is determined for at least some of the links included within the first list. A second list of links is then generated by evaluating the links of the first list against a set of rules. This set of rules prioritizes the links based at least partially on the determined access performance rates. Subsequently, the user interface is updated to reflect the second list.

20 Claims, 11 Drawing Sheets

Related U.S. Application Data filed on Oct. 18, 2017, provisional application No. 62/538,451, filed on Jul. 28, 2017, provisional application No. 62/574,063, filed on Oct. 18, 2017, provisional application No. 62/549,806, filed on Aug. 24, 2017, provisional application No. 62/574,070, filed on Oct. 18, 2017.

(51) Int. Cl.
```
G06F 16/955     (2019.01)
G06F 16/9538    (2019.01)
G06F 16/9535    (2019.01)
G06F 16/9038    (2019.01)
G06F 16/9032    (2019.01)
G06F 3/01       (2006.01)
G06F 3/0488     (2013.01)
G06F 3/0482     (2013.01)
G06Q 30/02      (2012.01)
H04L 29/08      (2006.01)
G06F 40/258     (2020.01)
G06F 16/31      (2019.01)
```

(52) U.S. Cl.
CPC .......... *G06F 40/258* (2020.01); *G06Q 30/02* (2013.01); *H04L 67/2842* (2013.01)

(56) References Cited

U.S. PATENT DOCUMENTS

| | | | |
|---|---|---|---|
| 1,026,865 | A1 | 4/2019 | Bosarge et al. |
| 2008/0071743 | A1 | 3/2008 | Jhaveri et al. |
| 2008/0208868 | A1 | 8/2008 | Hubbard |
| 2008/0313144 | A1 | 12/2008 | Huston |
| 2011/0173569 | A1 | 7/2011 | Howes et al. |
| 2012/0147037 | A1* | 6/2012 | Takami .............. G06F 16/9038 345/629 |
| 2012/0278704 | A1 | 11/2012 | Ying et al. |
| 2013/0021377 | A1 | 1/2013 | Doll |
| 2013/0024757 | A1 | 1/2013 | Doll et al. |
| 2013/0097186 | A1 | 4/2013 | van Hoff |
| 2013/0111395 | A1 | 5/2013 | Ying et al. |
| 2013/0219255 | A1 | 8/2013 | van Hoff et al. |
| 2013/0227682 | A1* | 8/2013 | Tse .......................... G06F 16/38 726/22 |
| 2014/0019868 | A1 | 1/2014 | Varian |
| 2014/0074624 | A1 | 3/2014 | Ying et al. |
| 2014/0074863 | A1 | 3/2014 | Walkingshaw et al. |
| 2014/0074934 | A1 | 3/2014 | van Hoff et al. |
| 2014/0075275 | A1 | 3/2014 | Aleksandrovsky et al. |
| 2014/0075289 | A1 | 3/2014 | Brant |
| 2014/0075339 | A1 | 3/2014 | Weskamp et al. |
| 2014/0181645 | A1* | 6/2014 | Macbeth ............. G06F 3/04815 715/249 |
| 2014/0198127 | A1 | 7/2014 | Ying |
| 2014/0207748 | A1 | 7/2014 | Sood et al. |
| 2014/0229477 | A1 | 8/2014 | Costello et al. |
| 2014/0245128 | A9 | 8/2014 | Brant |
| 2014/0320535 | A1 | 10/2014 | Ying |
| 2014/0351268 | A1 | 11/2014 | Weskamp et al. |
| 2015/0013009 | A1 | 1/2015 | Milener et al. |
| 2015/0015614 | A1 | 1/2015 | Doll |
| 2015/0019943 | A1 | 1/2015 | Ying et al. |
| 2015/0019957 | A1 | 1/2015 | Ying et al. |
| 2015/0019958 | A1 | 1/2015 | Ying et al. |
| 2015/0049093 | A1 | 2/2015 | Doll et al. |
| 2015/0100587 | A1 | 4/2015 | Walkingshaw et al. |
| 2015/0121297 | A1 | 4/2015 | Ying et al. |
| 2015/0149261 | A1 | 5/2015 | Walkingshaw et al. |
| 2015/0169744 | A1 | 6/2015 | Walkingshaw et al. |
| 2015/0193508 | A1 | 7/2015 | Christensen et al. |
| 2015/0199708 | A1 | 7/2015 | Ying et al. |
| 2015/0213492 | A1 | 7/2015 | Aleksandrovsky |
| 2015/0213610 | A1 | 7/2015 | Guo et al. |
| 2015/0227563 | A1 | 8/2015 | Walkingshaw et al. |
| 2015/0244830 | A1 | 8/2015 | Rietveld et al. |
| 2015/0248406 | A1 | 9/2015 | Walkingshaw |
| 2015/0248425 | A1 | 9/2015 | Walkingshaw |
| 2015/0248683 | A1 | 9/2015 | Walkingshaw |
| 2015/0317309 | A1* | 11/2015 | Farrell .............. G06F 16/24578 707/725 |
| 2015/0350271 | A1 | 12/2015 | Weskamp et al. |
| 2015/0356950 | A1 | 12/2015 | Doll |
| 2015/0363407 | A1 | 12/2015 | Huynh et al. |
| 2015/0370432 | A1 | 12/2015 | Ying et al. |
| 2015/0370777 | A1 | 12/2015 | Ying et al. |
| 2015/0379012 | A1 | 12/2015 | Awadallah et al. |
| 2016/0005196 | A1 | 1/2016 | Awadallah et al. |
| 2016/0012053 | A1 | 1/2016 | Weening et al. |
| 2016/0034143 | A1 | 2/2016 | Sharma |
| 2016/0085729 | A1 | 3/2016 | Chi et al. |
| 2016/0085730 | A1 | 3/2016 | Chang et al. |
| 2016/0124911 | A1 | 5/2016 | Ying |
| 2016/0124918 | A1 | 5/2016 | Ying |
| 2016/0171954 | A1 | 6/2016 | Guo |
| 2016/0202861 | A1 | 7/2016 | Weskamp |
| 2016/0224557 | A1 | 8/2016 | Chi et al. |
| 2016/0231894 | A1 | 8/2016 | Ying et al. |
| 2016/0232134 | A1 | 8/2016 | Doll et al. |
| 2016/0234290 | A1 | 8/2016 | Sharma |
| 2016/0253292 | A1 | 9/2016 | Ying et al. |
| 2016/0299654 | A1 | 10/2016 | Mai et al. |
| 2016/0323281 | A1 | 11/2016 | Griesmeyer |
| 2016/0349941 | A1 | 12/2016 | Johnsen |
| 2017/0046328 | A1 | 2/2017 | Ying et al. |
| 2017/0075533 | A1 | 3/2017 | Schaad |
| 2017/0078239 | A1 | 3/2017 | Chi et al. |
| 2017/0078413 | A1 | 3/2017 | Chi et al. |
| 2017/0103547 | A1 | 4/2017 | Guo |
| 2017/0123611 | A1 | 5/2017 | Hawkins |
| 2017/0124590 | A1 | 5/2017 | Griesmeyer |
| 2017/0134406 | A1 | 5/2017 | Guo et al. |
| 2017/0139562 | A1 | 5/2017 | Olson |
| 2017/0154117 | A1 | 6/2017 | Christensen et al. |
| 2017/0161782 | A1 | 6/2017 | Wigder |
| 2017/0173635 | A1 | 6/2017 | Schroader |
| 2017/0206192 | A1 | 7/2017 | Ying |
| 2017/0220216 | A1 | 8/2017 | Thompson et al. |
| 2017/0220580 | A1 | 8/2017 | Chi et al. |
| 2017/0228463 | A1 | 8/2017 | Sharma |
| 2017/0257431 | A1 | 9/2017 | Zhao |
| 2017/0264934 | A1 | 9/2017 | Guo et al. |
| 2017/0287109 | A1 | 10/2017 | Tasfi |
| 2017/0287158 | A1 | 10/2017 | Guo et al. |
| 2017/0300201 | A1 | 10/2017 | Wigder |
| 2017/0300293 | A1 | 10/2017 | Zhao et al. |
| 2017/0300457 | A1 | 10/2017 | Wigder et al. |
| 2017/0308518 | A1 | 10/2017 | Sjolander et al. |
| 2017/0310623 | A1 | 10/2017 | Sjolander |
| 2017/0323020 | A1 | 11/2017 | Bosarge et al. |
| 2018/0129748 | A1 | 5/2018 | Bosarge et al. |

OTHER PUBLICATIONS

U.S. Appl. No. 16/044,905, filed Jul. 25, 2018, Bosarge et al.
U.S. Appl. No. 16/045,069, filed Jul. 25, 2018, Bosarge et al.
Palser, Barb. "Spread the Carousel Love." Relay Media, Mar. 6, 2016, https://web.archive.org/web/20160406111143/https:/www.relaymedia.com/2016/03/06/spread-the-carousel-love/ Accessed Jun. 26, 2019.
PCT International Search Report and Written Opinion of the International Searching Authority for PCT/US17/23036, dated Jul. 20, 2017, 13 pages.
Non-Final Office Action dated Apr. 16, 2020 for U.S. Appl. No. 16/045,069.
Non-Final Office Action dated Apr. 17, 2020 for U.S. Appl. No. 16/044,905.

* cited by examiner

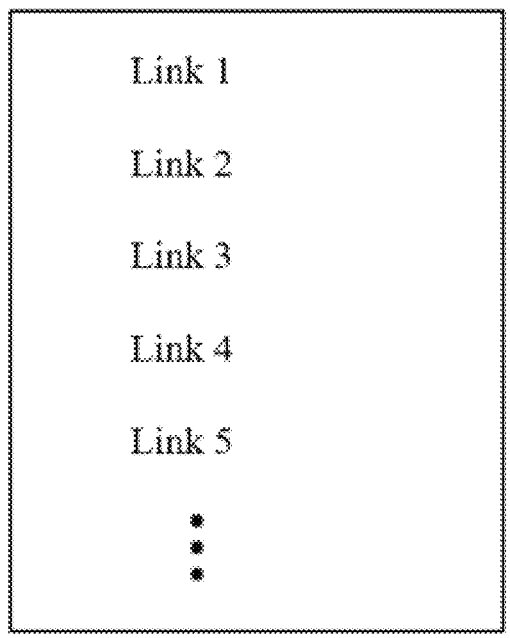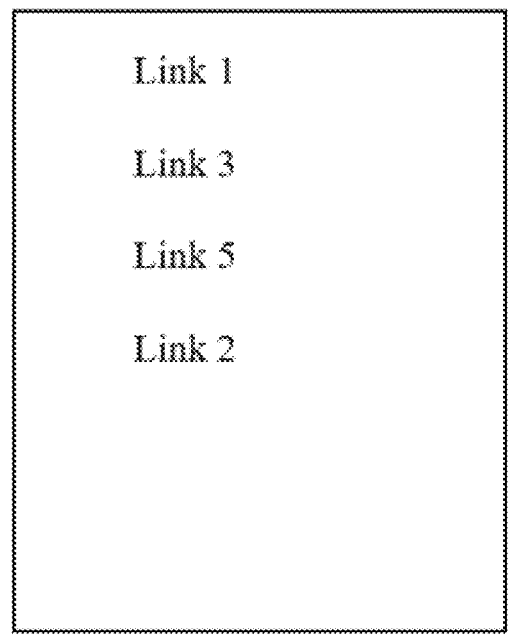
Figure 8

900

| Receive A Query That Included A Request To Access Digital Content. | 910 |

| Obtain A Set Of Query Results That Includes A First List Of Selectable Links, Each Of These Selectable Links Being (1) Associated With The Digital Content Requested By The Query And (2) Prioritized According To A Particular Order. | 920 |

| Determine An Access Performance Rate For Each Of At Least Some Of The Selectable Links Included Within The First List. | 930 |

| Generate A Second List Of Selectable Links By Evaluating The Selectable Links Included Within The First List Against A Set Of Rules, The Set Of Rules Causing The Links In The Second List To Be Prioritized Based At Least Partially On The Determined Access Performance Rates. | 940 |

| Update The User Interface To Reflect The Second List Of Selectable Links. | 950 |

| Display A First Website On The User Interface. | 1010 |

| Receive A Swipe Gesture At The User Interface. | 1020 |

| Cause The First Website To Be Replaced By User-directed Content. | 1030 |

| In Response To A Second Swipe, Cause The User-directed Content To Be Replaced By A Second Website. | 1040 |

Figure 10

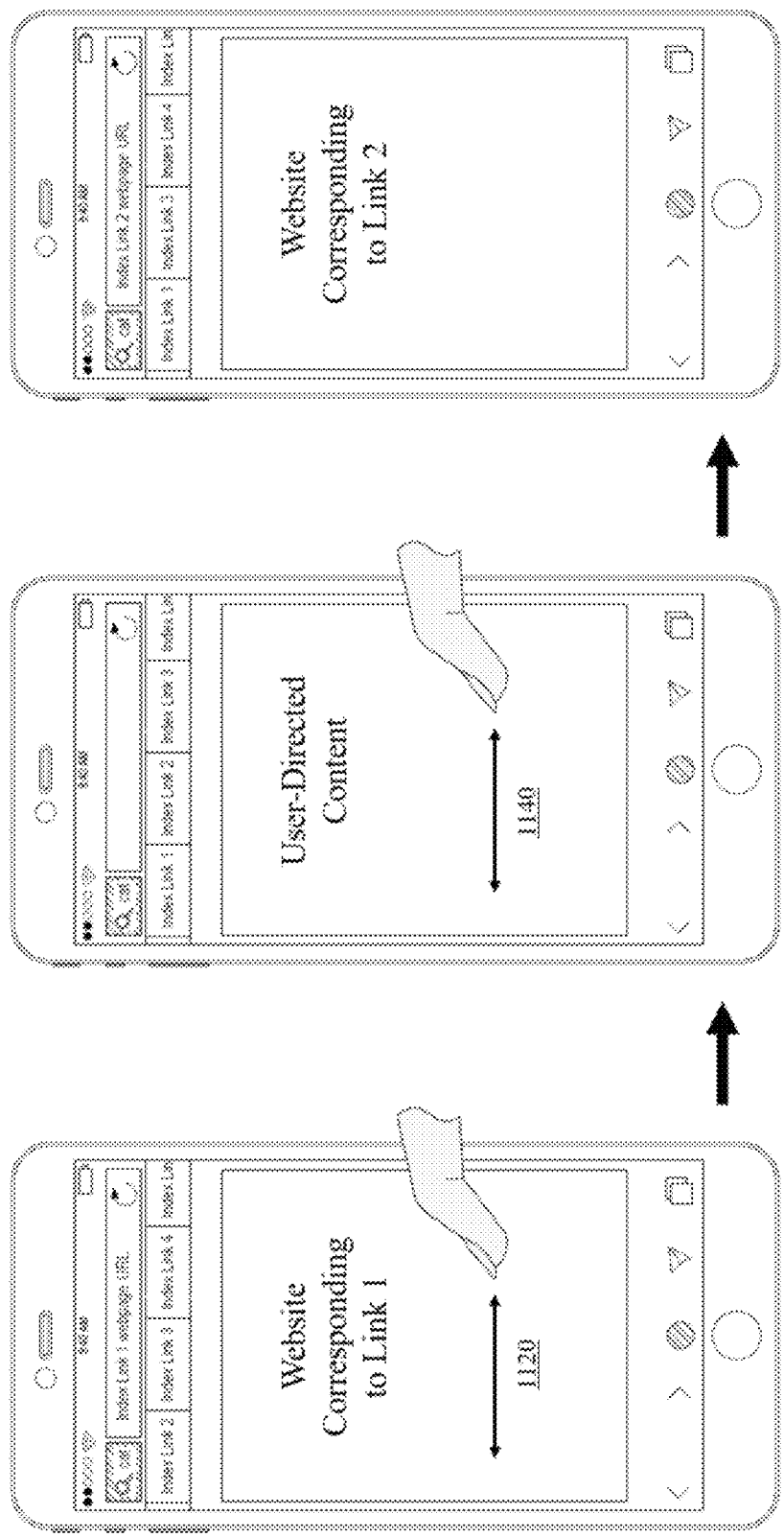

PAGE COMPETE

CROSS-REFERENCE TO RELATED APPLICATIONS

This application claims benefit and priority to U.S. Provisional Application No. 62/536,851, entitled "PAGE COMPETE", filed on Jul. 25, 2017, as well as U.S. Provisional Application No. 62/574,058, entitled "PAGE COMPETE", filed on Oct. 18, 2017, as well as U.S. Provisional Application No. 62/538,451, entitled "DYNAMIC USER AGENT STRINGS", filed on Jul. 28, 2017, as well as U.S. Provisional Application No. 62/574,063, entitled "DYNAMIC USER AGENT STRINGS", filed on Oct. 18, 2017, as well as U.S. Provisional Application No. 62/549,806, entitled "AUTOMATED CONTEXTUAL INDEX SUPPRESSION", filed on Aug. 24, 2017, as well as U.S. Provisional Application No. 62/574,070, entitled "AUTOMATED CONTEXTUAL INDEX SUPPRESSION", filed Oct. 18, 2017, and all of which are incorporated herein by reference in their entireties.

BACKGROUND

Various systems and interfaces have been created for accessing and navigating content on the Internet. For instance, when a user enters search terms into a web browser, that browser will initially generate a search request. This search request is then sent to one or more search engines (e.g., Google, Bing, Yahoo, etc.). These search engines search the Internet to find websites that are relevant to the search terms. After finding relevant websites, the search engines return their search results to the browser. The browser then generates a user-friendly list to display the search results (i.e. it generates a list of indexed content). This list shows the search results and can be used by the user to navigate to the relevant websites that correspond to the displayed list of search results. Many browsers also display a variety of different controls that allow the user to better work with the listed content.

When attempting to find relevant websites, it is typical for search engines to utilize indexes that identify correlations between various search terms and the content that is available on different webpages. The indexes are formulated and updated in response to data obtained by web crawlers that identify and examine the countless number of webpages. Each of the search engines utilizes complex algorithms to weight the relevance between the search terms and the content organized in the search engine indexes. After a search is complete, most search engines compile their search results as an ordered list which is commonly referred to as a Search Engine Results Page (SERP). This SERP is then delivered to the browser, and the browser may then format or perform other customizations to the SERP. Then, the browser presents the search results (i.e. the potentially customized SERP) to the user.

As alluded to above, the SERP includes references to different webpages that each contain content associated with the search terms. When presented by the browser, the SERP may be customized to include selectable links for each of the resulting search items. When such a selectable link is selected, the browser is redirected from its own domain (e.g., the browser may belong to the search engine, so the browser's domain may be the same as the search engine's domain) to one or more different domains that are hosting the content corresponding to the selected link.

In some instances, the links included within the SERP are sequenced in a particular order. This order can be based on a variety of different factors. To illustrate, some ordering factors cause the SERP to be sorted based on relevance (e.g., on a contextual correlation between the search terms provided by the browser and the website). Other ordering factors cause the SERP to be sorted based on how recently the content was added to or modified within the search engine's index. Still further, other factors cause the SERP to be sorted based on how recently the websites were examined and/or updated by the search engine's web crawlers.

Each search engine (e.g., Google, Bing, Yahoo, etc.) may have its own method of generating and displaying its SERP on its browser. As discussed earlier, each search engine uses an index to identify correlations between websites and search terms. These indexes are formulated and updated by the different search engines in different ways. As a result, the SERPs of all of the search engines are different. For instance, the indexes will be different because the search engines use different web crawlers at different times. Further, the indexes will be different because the search engines use different algorithms for determining the significance or relevance between different terms. Accordingly, the SERP (i.e. a resulting set of search results) returned by each of the different search engines will almost always be different. To illustrate, the SERP provided by one search engine might include search results arranged in a different order than the SERP provided by a different search engine. Likewise, search results in one search engine's SERP might be excluded from a different search engine's SERP.

Some users are aware of the foregoing discrepancies and will sometimes go through the laborious process of interfacing with a plurality of different search engines to ensure that they are receiving the most appropriate content being searched for. This process of interfacing with different search engines, however, is very time consuming and requires the user to navigate to the different search engine domains. Once there, the user is then required to explicitly enter new search terms to begin the search process.

Some research into search behaviors on the Internet has shown that the top three results of any given SERP gets a combined click-through rate of just over 60%. Accordingly, the majority of clicked links are the first three listed links. Unfortunately, because of bandwidth limitations, the speed for loading the various web pages (including the first three web pages in a search query) can be a significant factor in general user satisfaction when surfing the Web.

Even with known network congestion issues impacting mobile devices, users still want and expect web pages and other Internet resources to load quickly and efficiently. In fact, most experience shows that speed is the number one statistic that influences user satisfaction. Unfortunately, there are hundreds if not thousands of things that can cause a website to be slow or sluggish or not respond at all, regardless of a given search engine's ranking in any particular SERP. Similarly, oversaturation of cellular networks or Wi-Fi networks can also lead to sluggishness.

While it is known that access speeds vary dramatically, current search engine rankings for websites (i.e. search results) fail to account for the issues discussed above. Instead, the generated SERPs are relatively static thereby leading to static results being presented to the user. To clarify, website rankings are generally based on a set of pre-compiled scores that take no consideration for actual, "real-time" conditions. Even further, these set of pre-compiled scores, which are used to rank the websites in the SERP, also fail to accommodate for the state of various web sites and servers at the moment of query execution. Stated differently, the current technology fails to consider real-time connection issues when ranking the items in a SERP. Even further, current search engines do not modify their webpage rankings to account for factors such as current network congestion, current network throttling, current signal strength, current device location, current tower capacity, current host capabilities and other such current factors that can impact the loading speed of a web page.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY

Disclosed embodiments are directed to systems, hardware storage devices, and methods for optimizing search result listings based on current conditions, such as responsiveness of the websites included in the search result listings.

In some embodiments, a query is received at a computer system's user interface. This query includes a request to access digital content. In response to this query, the embodiments obtain a set of query results. In some instances, this set of query results includes a first list of selectable links. Here, each link included within the first list is associated with the digital content that was requested in the query and is also prioritized according to a particular order (e.g., the search engine's SERP order). The embodiments are also able to determine an access performance rate for at least some of the links in the first list. Then, the embodiments generate a second list by evaluating the links in the first list against a set of rules. Notably, this set of rules causes the links in the second list to be prioritized based at least partially on their access performance rates. Thereafter, the embodiments update the user interface to reflect the second list of links. In some instances, the links themselves are displayed on the user interface while in other instances a website corresponding to a particular link in the second list (e.g., a link given the highest priority) is automatically displayed on the user interface.

This Summary is provided to introduce a selection of concepts in a simplified form, which concepts are further described below in the Detailed Description. This Summary is not intended to identify key features or essential features of the claimed subject matter, nor is it intended to be used as an aid in determining the scope of the claimed subject matter.

Additional features and advantages will be set forth in the description which follows and, in part, will be obvious from the description, or may be learned by the practice of the teachings herein. Features and advantages of the embodiments may be realized and obtained by means of the instruments and combinations particularly pointed out in the appended claims. Features of the embodiments will become more fully apparent from the following description and appended claims, or may be learned by the practice of the embodiments as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 8 illustrates a resulting list of links that are generated in response to an evaluation of a set of rules against a SERP.

FIG. 9 illustrates an exemplary method for implementing a set of rules to optimize a search result listing.

FIG. 10 illustrates another exemplary method for displaying content on a user interface.

FIG. 11 illustrates a navigation action that may be used to transition from one webpage to another.

DETAILED DESCRIPTION

Figure 1:
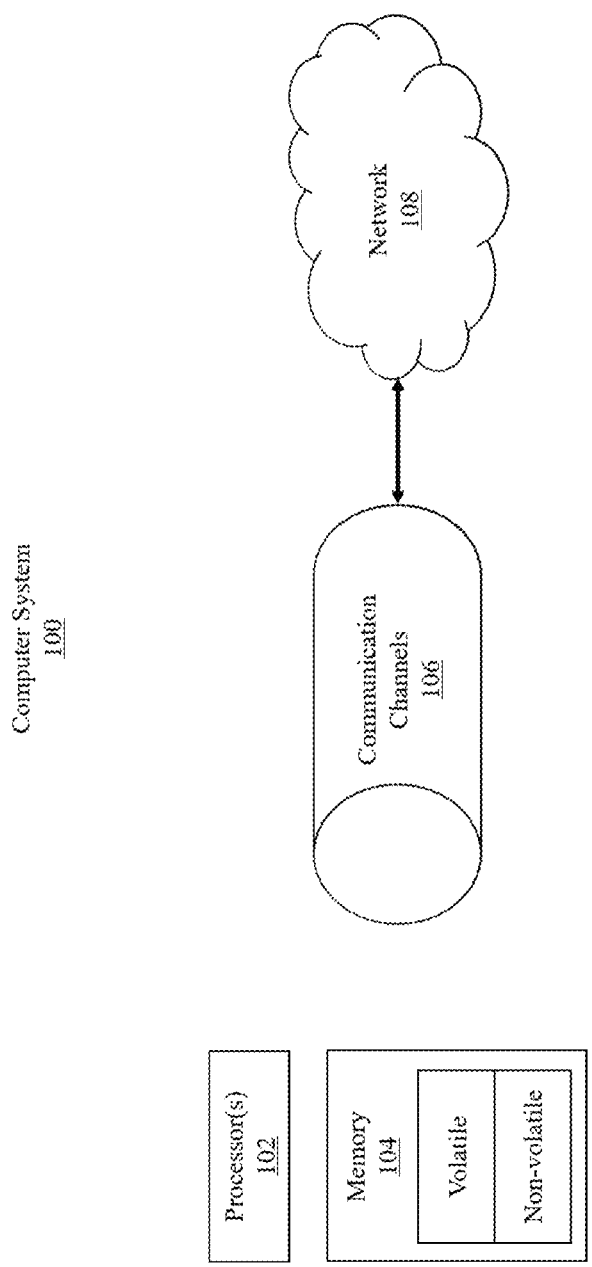
FIG. 1 illustrates an abstract view of a computer system.

Disclosed embodiments are directed to systems, hardware storage devices, and methods for implementing a particularized set of rules to optimize a search result listing. In particular, the embodiments utilize page compete technologies to dynamically modify search results, in real-time, based at least in part on speed and accessibility (i.e. access performance rates) of the webpages portrayed in a given search result list. "Real-time" generally refers to a time that is substantially contemporaneous with the time when the search was first executed or very shortly thereafter (e.g., 0.1, 0.2, 0.3, 0.4, 0.5, 0.6, 0.7, 0.8, 0.9, 1 or 1 to a few seconds after the search was executed). As used herein, the terms "website" and "webpage" are synonymous and can be interchanged as desired.

The embodiments may be implemented to overcome many of the technical difficulties and computational expenses associated with providing worthwhile webpage results to a user. In particular, the embodiments enable a web browser to provide a dynamically tailored (in real-time) set of search results to a user. The search results are dynamic because the web browser is configured to consider a plethora of real-time factors that influence the immediate accessibility of one or more relevant webpages. These real-time factors are considered during the generation of a set of rules that are subsequently evaluated against the search results so as to further refine and prioritize the resulting list to thereby create a new list of results.

Because speed is an influential factor in improving a user's web browsing satisfaction, the present embodiments provide a valuable technical advantage over the existing technology by not only considering historically gathered relevancy data but also considering real-time access data when displaying search results to the user. By considering the real-time, or rather immediate or contemporaneous, access data, the user will be presented search results that have been specifically tailored to improve his/her user experience.

The present embodiments also advance the art by providing more reliable search results. To illustrate, users often expect to be able to very quickly access a webpage after clicking a corresponding link. It is often frustrating, however, when the webpage either fails to load or does not load in a timely manner. By following the principles discussed in this disclosure, the present embodiments provide significant advancements over the art by providing much more reliable, dependable, and user-tailored search results. As a result, the user's overall experience and satisfaction is dramatically improved when the embodiments are practiced.

The disclosed embodiments also improve the overall performance of a computer system. As discussed above, the current embodiments provide for a browser that displays a list of search results. These search results, according to the principles presented herein, are at least partially ranked based on one or more real-time metrics (e.g., a current accessibility metric). By considering the real-time accessibilities of the webpages, the computer system can provide a list of webpages that are immediately accessible and that will quickly load instead of webpages that might be slow or temporarily down. As a result, the embodiments enable the computer system to avoid unnecessary or wasteful processing because those slow or down webpages will be made less available to a user (e.g., they will be ranked much lower on the search results list). Because they are made less available, those webpages likely will not be selected by the user. As a result, the computer system is optimized because its resources are utilized to access only webpages that are readily accessible. Accordingly, the present embodiments actually improve the performance of the computer system.

To achieve these benefits, the disclosed embodiments receive a query at a computer system's user interface. This query includes a request to access digital content. In response to this query, the embodiments obtain a set of query results. In some instances, this set of query results includes a first list of selectable links. Here, each link included within the first list is associated with the digital content that was requested in the query and is also prioritized according to a particular order (e.g., a search engine's ranking method). The embodiments are also able to determine an access performance rate for at least some of the links in the first list. Then, the embodiments generate a second list by evaluating the links in the first list against a set of rules. Notably, this set of rules causes the links in the second list to be prioritized based at least partially on their access performance rates. Thereafter, the embodiments update the user interface to reflect the second list of links. In some instances, the links themselves are displayed on the user interface while in other instances a webpage corresponding to a particular link in the second list (e.g., a link given the highest priority) is automatically displayed on the user interface.

Having just described various benefits and high-level attributes of the embodiments, the disclosure will now focus on FIG. 1, which presents an introductory discussion of an exemplary computing system. Following that discussion, various architectures and supporting illustrations will be discussed using FIGS. 2-8. Lastly, various flow diagrams and illustrations will be detailed with respect to the remaining figures (FIGS. 9-11).

Exemplary Computing Systems

As illustrated in FIG. 1, an exemplary computing system 100 includes, in its most basic configuration, at least one hardware processor 102 and memory 104. The memory 104 may be physical system memory, which may be volatile, non-volatile, or some combination of the two. The term "memory" may also be used herein to refer to non-volatile mass storage such as physical storage media. If the computing system 100 is distributed, the processor 102, memory 104, and/or storage capability may be distributed as well. As used here, the term "executable module," "executable component," or even "component" can refer to software objects, routines, or methods that may be executed on the computing system. The different components, modules, engines, and services described herein may be implemented as objects or processors that execute on the computing system (e.g., as separate threads).

Embodiments of the present invention may comprise or utilize a special-purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

The computer system 100 also includes one or more communication channels 106 for communication with a network 108. A "network" (e.g., the network 108) is defined as one or more data links that enable the transport of electronic data between computer systems and/or modules and/or other electronic devices. When information is transferred, or provided, over a network or another communications connection (either hardwired, wireless, or a combination of hardwired or wireless) to a computer, the computer properly views the connection as a transmission medium. Transmissions media can include a network and/or data links which can be used to carry out desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC") and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Figure 2:
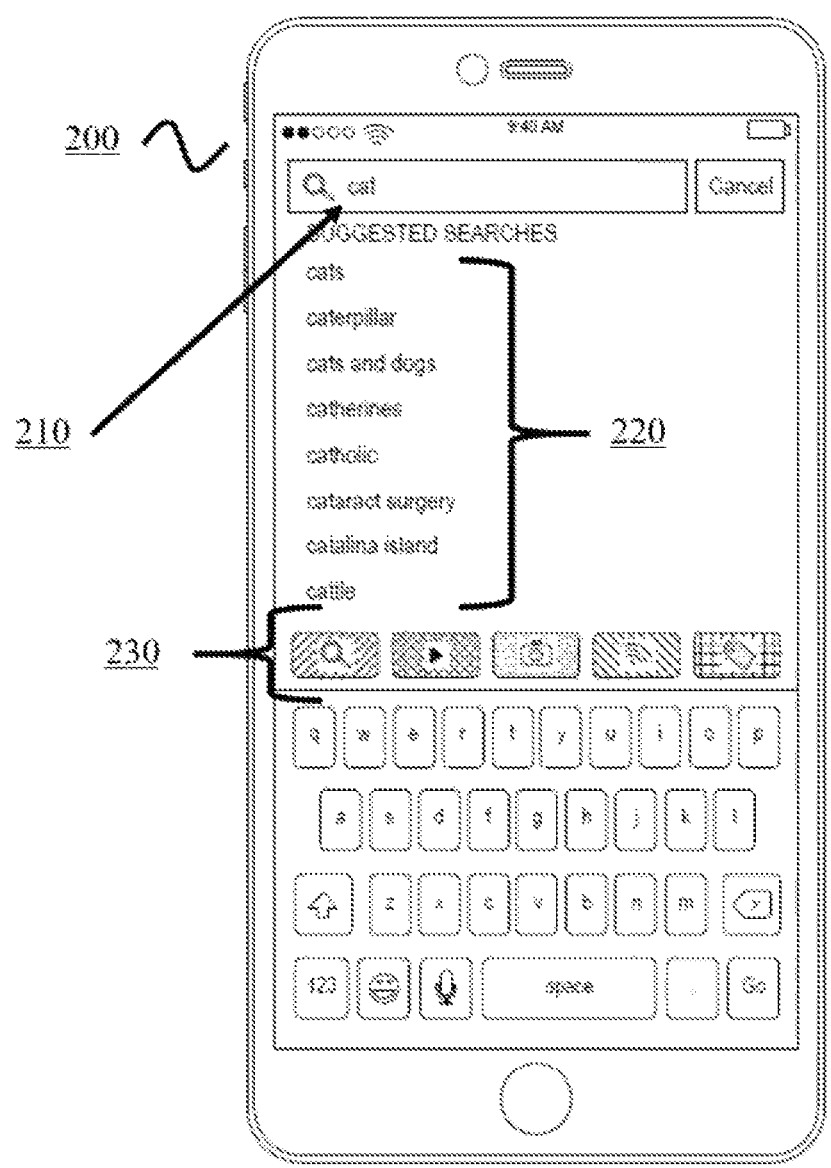
FIG. 2 illustrates an exemplary user interface for displaying webpages resulting from a search event.

As detailed above, computer systems are able to provide a broad variety of different functions. One such function includes a web browser user interface as shown in FIG. 2. Accordingly, attention will now be focused on an exemplary browser user interface that may be used by the embodiments presented herein.

Exemplary Browser User Interface

FIG. 2 illustrates an example of a browser interface 200 on a mobile device. This browser interface 200 includes a search field 210, a set of suggested search terms 220, and a plurality of pivot icons 230. When a user begins to enter a search term into the search field 210, the set of suggested search terms 220 will appear. Each term in the set of suggested search terms 220 is based on the user's search term and is useful in assisting the user in entering his/her desired search terms. Here, the user has entered "cat" in the search field 210. As a result, each term in the set of suggested search terms 220 is related to the three-letter word "cat."

Each of the different pivot icons 230 corresponds to a filter that can be used to refine the user's search results. In this regard, when one of the pivot icons 230 is selected, a search request is formulated by the browser to cause one or more search engines to search for content associated with that filter/content type (e.g., if a "news" pivot icon was selected, then news articles corresponding to the search term will be displayed). Selection of one or more of the pivot icons 230 will trigger the formulation of a search request for content corresponding to the selected pivot icon (e.g., News).

Once a search is formulated by the browser, it will be sent to a predetermined default search engine. Alternatively, in some embodiments, the search will be sent to multiple different search engines (e.g., Google, Bing, Yahoo, Giphy, YouTube, Amazon, Ebay, etc.). In this regard, it will be appreciated that the term "search engine" corresponds to any computing system or Internet domain that is configured to receive a search request from a browser. When the search request is processed by the search engine, the search engine searches the Internet to identify one or more webpages that are relevant to the user's search request. To complete the search request, the search engine generates a set of search results that includes the one or more relevant webpages. Sometimes, the search results are composed in the form of a SERP (Search Engine Results Page). A SERP may comprise one or more webpages or instructions for rendering those webpages' Uniform Resource Locators (URL). The SERP will typically include selectable hyperlinks to those URLs.

In some embodiments, the SERP will not be displayed to the user. Instead, the SERP is used to derive a new index that is suppressed in memory and that is used as the basis for navigating to the webpages identified in the SERP. To clarify, in some instances, the SERP is not displayed to the user. Instead, the browser may be configured to further customize or refine the SERP in various different ways. By way of example and not limitation, such customizations might include implementation of a page compete process (discussed later) or modifications to make the SERP more visually appealing for the user. In some instances, the derived index excludes one or more references that were identified in the SERP. As a result, the derived index (also referred to herein as a "suppressed index") may comprise only a subset of the SERP's search results.

FIG. 3A illustrates an example browser interface similar to the browser interface 200 of FIG. 2. In particular, FIG. 3A includes an index link 310A, a list of indexes 320A, a displayed webpage 330A, and a swipe action 340. The index link 310A is a URL for the displayed webpage 330A. The list of indexes 320A are shown as tabs that correspond to some of the remaining search results included within the SERP. Notably, the ordering of the list of indexes 320A is based on the same ordering as the search results used by the browser (e.g., the SERP). The displayed webpage 330A is displayed in response to a search term that was previously entered in a search field (e.g., the search field 210 of FIG. 2) and/or in response to a user selecting a particular search term from the set of suggested search terms 220.

Although the webpage 330A is shown in abstract form, it will be appreciated that the webpage 330A includes a variety of content (e.g., a title, various images, text, etc.).

In this embodiment, the user previously entered or selected the term "cat" as the term to be searched. In response, the webpage 330A is displayed. Notably, the webpage 330A corresponds to the user's search term (i.e. cat). To clarify, after the search term is entered at the browser, the browser submitted a search to one or more predetermined search engines. The search engine(s) then scoured the Internet in search for webpages that include content relevant to the user's search term (i.e. cat). After conducting the search, the search engine(s) generate search results, which, as discussed earlier, may be in the form of a SERP. As also discussed, the browser may additionally create a derived index using the SERP and may cause the SERP to be suppressed.

In the situation presented in FIG. 3A, the browser also automatically accessed (i.e. selected and displayed) the first webpage in the derived index. In other words, after the SERP was generated, the embodiment immediately caused a webpage corresponding to one of the search results (e.g., perhaps the first search result) to be displayed on the user interface, which display was performed without any user interaction.

Here, a swiping action 340 will enable the user to access a next or previous webpage identified in the suppressed index. If there is no previous webpage identified in the suppressed index when the swipe action 340 is performed, the browser may display the suppressed list so that the suppressed list effectively acts as the previous webpage. As shown in FIG. 3A, a webpage corresponding to index link 2 is available to view next.

FIG. 3B shows a resulting user interface that is displayed after the swiping action 340. In this instance, the user swiped to the right. As a result, a new webpage 330B is displayed. Additionally, the index link 310B, which corresponds to the index link 310A, is updated to reflect the URL of the new webpage 330B. Additionally, the displayed list of indexes 320B, which corresponds to the list of indexes 320A, is also updated. Now, index link 2 is hidden from the list of indexes 320B (because its webpage is currently being displayed) and index link 1 is now displayed in the list of indexes 320B, as shown in FIG. 3B.

While the above discussion focused on an "overall" suppressed list, other embodiments are configured to make use of a second, or rather a "derivative," list. For instance, suppose the webpage 330B shown in FIG. 3B includes additional links of its own. By way of example, many webpages include hyperlinks to other webpages. As a result, a user can navigate from one webpage to another simply by clicking a link that is included within an existing webpage. Some of the current embodiments are able to analyze a webpage to extract some or all of the links/hyperlinks that are included within that webpage. Once extracted, then these embodiments are able to generate a "derivative" list of webpages. The webpages in this derivative list were all originally included in the one webpage that forms a part of the suppressed list. Accordingly, each webpage that is shown in the suppressed list, or rather the list of indexes 320B, may have a corresponding derivative list.

Once this derivative list is generated, then the user can navigate through the webpages in the derivative list according to the same principles that have been discussed with regard to the user's navigation through the webpages that are included in the list of indexes 320B. For instance, by swiping in a particular direction, the user is able to navigate through the webpages included in the derivative list. Here, it will also be appreciated that the user is able to navigate between the webpages in the derivative list and the webpages of the list of indexes 320B without having to perform backtrack actions, as is commonly required in the conventional technology. An example will be helpful. In the conventional technology, when a user drills down through the hyperlinks of a set of webpages (e.g., the user navigates to a first webpage, then selects a hyperlink within that first webpage in order to navigate to a second webpage, and so on in a "drill down" process), then the user will be required to backtrack through his/her sequence of navigations in order to return to the original webpage or to navigate to a next webpage that was originally included as part of the user's original search results.

Figure 3:
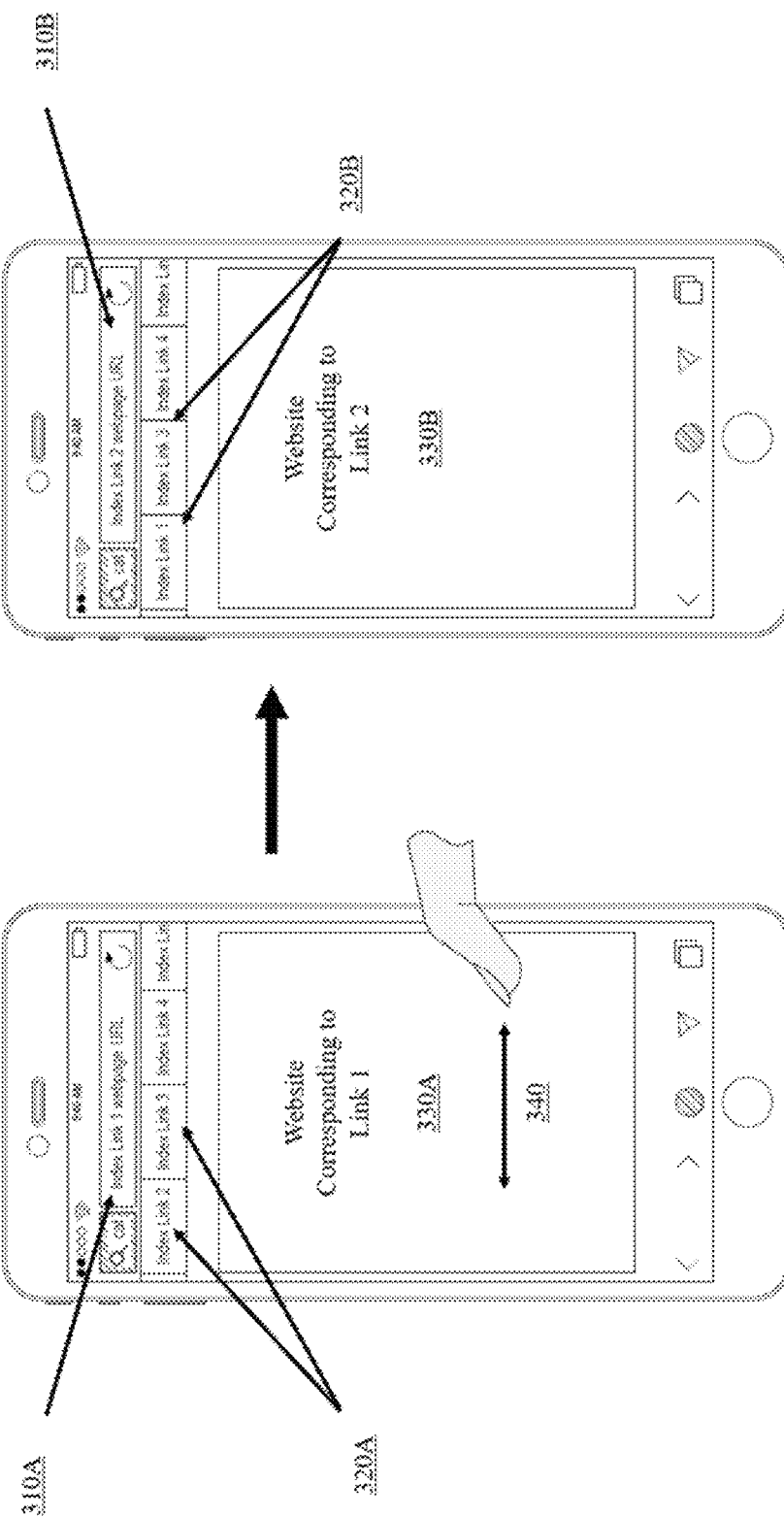
FIGS. 3A and 3B illustrate other exemplary user interfaces for displaying webpages resulting from a search event.

In contrast to the conventional technology, the current embodiments are configured to enable a user to readily transition between navigating through the webpages of the derivative index, or any other index described herein (e.g., the SERP). For example, suppose a list of indexes is initially created (e.g., the list of indexes 320B of FIG. 3B). This list of indexes makes reference to at least four different webpages (as shown in FIG. 3B). Now suppose that one of the webpages includes a number of hyperlinks. The disclosed embodiments enable a user to drill down through the hyperlinks in any of the pages and to, thereafter, at any time, swipe or navigate to another linked webpage from the base suppressed index (e.g., the SERP, the derived index or other base index). For instance, by way of example, the embodiments are configured to enable a user to access a webpage that is included in the SERP (e.g., the Index Link 2 shown in FIG. 3). After accessing the webpage, then the embodiments enable the user to selectively/progressively drill down into additional linked websites that are included in that first webpage. At any point throughout the progressive drilling operation, the embodiments are configured such that the user is able to immediately return to the original SERP by clicking a button or performing a swiping gesture. For instance, once the user accesses the first webpage, then the derivative list may be generated. By performing a swipe gesture, the user can then access the links in the derivative list (or any other list). Furthermore, at any point throughout the process, the user is able to immediately return to the list of indexes included in the SERP as shown in the list of indexes 320B of FIG. 3B by clicking a button or performing a swipe gesture.

In one embodiment, using the navigation techniques described herein (e.g., a swiping action), the user is able to navigate from the original webpage that is included in the list of indexes (e.g., list of indexes 320B) directly into the first webpage included in the derived list. Once the derivative list is navigated into, the user is able to navigate through each of the remaining webpages of the derivative list. Even further, once the user has completed his/her desired navigations through the derivative list (e.g., either by navigating completely through the list or by navigating through only a part of the list until the user no longer desires to navigate through the derivative list), then the user can immediately return to the original list of indexes (i.e. the SERP which is illustrated by the list of indexes 320B) without having to backtrack. This return to the original list of indexes is performed in a variety of ways. For example, in one embodiment, after a user has navigated through all of the webpages in the derivative list, the next webpage in the original list of indexes becomes immediately available, and the user simply has to swipe to navigate to the next webpage. In an alternative situation in which the user did not navigate completely through the webpages of the derivative list, the user simply needs to click on one of the links included in the list of indexes 320B as shown in FIG. 3B. By directly clicking on the link in the list of indexes 320B, the user is able to navigate out of the derivative list and return to the original list of indexes (e.g., the list of indexes 320B). Accordingly, the current embodiments enable a user to navigate through both a list of indexes and a derivative list (and to navigate between those two lists) without requiring the user to perform a backtrack operation.

In some embodiments, the system pre-fetches/caches a predetermined number of webpages referenced in the suppressed index. This pre-fetch/cache action may be performed before and/or after one of the webpages is automatically displayed. Further, this pre-fetch/cache action is performed even before receiving navigation input from the user. Subsequently, when a request is made for the next/previous webpage (e.g., by the user performing a swipe gesture), the browser simply accesses the already-cached webpage from the system's memory.

In some embodiments, only selected portions of the webpages will be automatically pre-fetched/cached. By way of example, some mobile device users have limited data plans. If the user downloads more content than is allowed by his/her plan, then that user is charged an extra fee. Accordingly, some embodiments will actively limit the amount of pre-fetched/cached content in an effort to protect the user from incurring additional expenses related to data expenditure. Some embodiments accomplish this objective by caching only pre-selected or pre-determined types of webpage content. For example, suppose a webpage includes a title, text, links, and a gif. By analyzing the user's search terms, some embodiments are able to determine which portions of the webpage are most relevant to the user's search term. For instance, based on the user's browsing history (e.g., the user historically clicks only on the first link), the embodiments may determine that the gifs for the second webpage need not be pre-fetched/cached. Instead, those gifs are loaded only if the user actually navigates to that webpage. Accordingly, some of the embodiments are able to limit the amount of pre-fetched/cached content in an effort to reduce a mobile device user's data consumption.

As discussed above, the search results from each of the search engines includes a SERP. As also discussed above, the browser may additionally create a corresponding suppressed, or rather parsed, index that is used for navigating the content. This suppressed index is used to identify the links that are presented in the navigation control panel. However, rather than providing the SERP from only a single search engine, the current embodiments are also able to combine the search results of multiple search engines. When multiple different search engine results are received, these embodiments create a suppressed index using the SERPs of all of the other search engines. By way of example and not limitation, the embodiments may combine a Google SERP, a YouTube SERP, and a Bing SERP to create a new SERP that is then made available to a user.

As described herein, systems are provided for enabling a user to navigate between a search engine's search results (or even the results obtained from multiple search engines). Indeed, a user can navigate through a plurality (2, 3, 4, or more) webpages that have been automatically cached and that are available for immediate viewing. In this regard, the disclosed embodiments facilitate continuous navigation from a suppressed index without having to display that index. Accordingly, by using the exemplary user interface discussed herein, the embodiments greatly improve the efficiency for navigating Internet content, particularly on mobile devices and particularly when the linked content is hosted by different domains.

Page Compete

Having just described a new type of user interface that can be used to display the search results created by the current embodiments, attention will now be turned to a system that is able to perform a page compete process. This process is used to optimize the search result listing, which optimization is performed to enhance the user's browsing experience.

Figure 4:
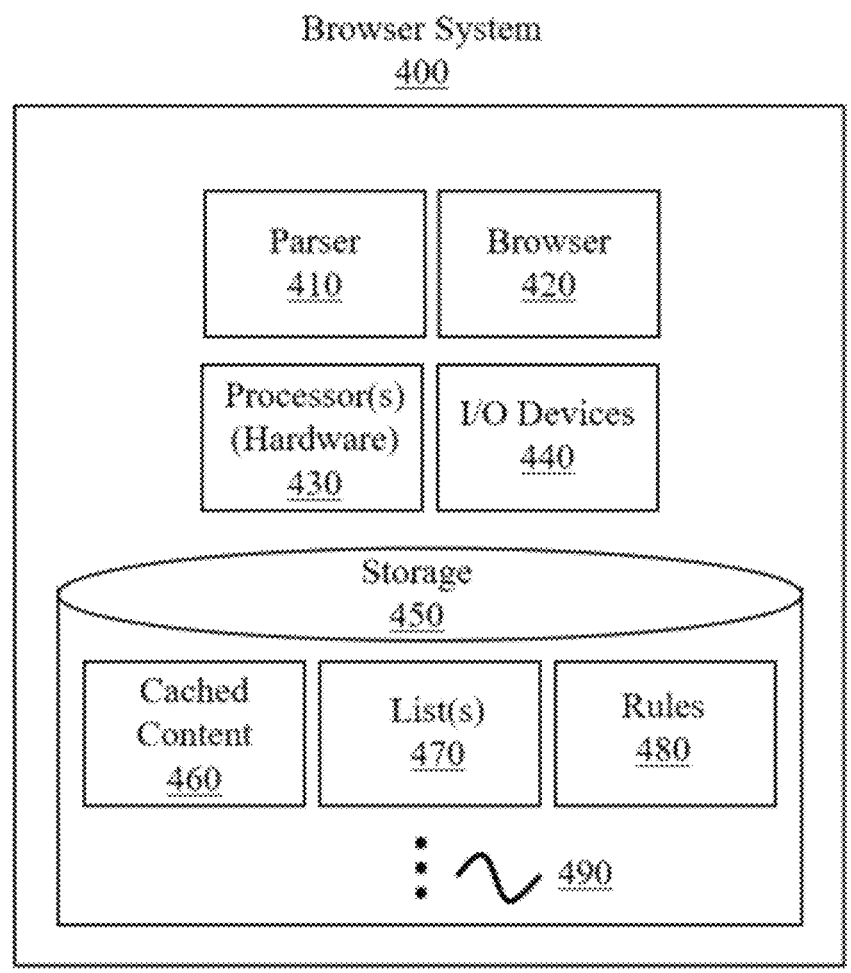
FIG. 4 illustrates an exemplary computer system that can be used to optimize a list of search results.

For example, FIG. 4 presents a browser system 400 capable of performing the functions described herein to optimize a search result listing. Browser system 400 includes all of the functionalities, features, and abilities that were discussed in conjunction with the computing system 100 of FIG. 1.

As shown in FIG. 4, the browser system 400 includes a parser 410, a browser 420, hardware processors 430, input/output (I/O) devices 440, and storage 450. The storage 450 includes various different content, including cached content 460, list(s) 470 (e.g., a SERP), and rules 480. Although the storage 450 is depicted as having only three different data items, the ellipses 490 demonstrates that the storage 450 may include many more different data items.

The embodiments presented herein, which may be implemented by the browser system 400, significantly improve the user's experience by providing a refined (i.e. sorted) set of web results. This sorting is implemented using a particular set of rules that employ different real-time metrics associated with webpages, which webpages are associated with a set of search results. Additional functionality and advantages of the various components (e.g., the parser 410, browser 420, etc.) of the browser system 400 will be discussed later.

Figure 5:
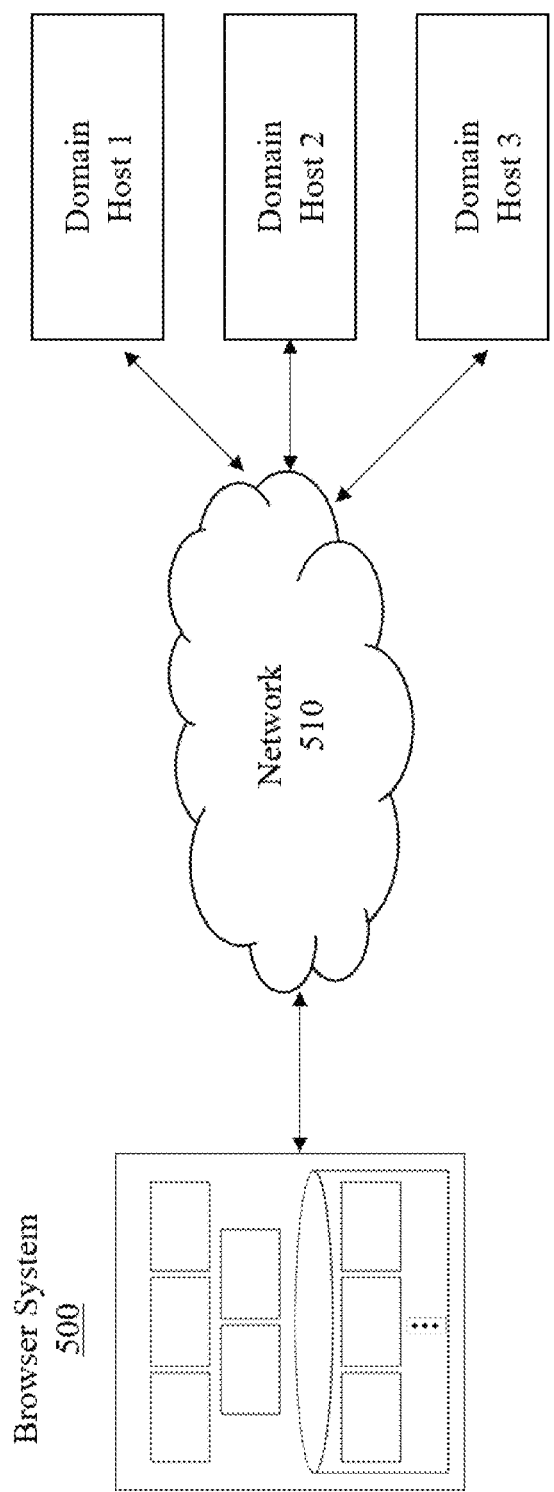
FIG. 5 illustrates an abstracted view of an exemplary computer system that can connect to a network to communicate with remote hosts.

FIG. 5 shows a browser system 500 that is similar to the browser system 400 of FIG. 4. In FIG. 5, however, the browser system 500 is shown as being connected to a network 510, which may be similar to the network 108 of FIG. 1. By using the network 510, the browser system 500 is able to communicate and interact with a variety of different domain hosts (e.g., domain host 1, domain host 2, domain host 3, etc.). In other words, FIG. 5 illustrates that the browser system 500 is able to connect to the network 510 to access remotely stored information. By connecting to the network 510, the browser system 500 (and the browser system 400 of FIG. 4) are able to acquire and then manipulate a set of search results in order to improve a user's browsing experience.

Returning to FIG. 4, the processors 430 may include CPU(s), GPU(s), or a combination of both. The I/O devices 440 may include displays, touch sensitive screens, interfaces, speakers, cameras, microphones, keyboards, or any other kind of input device.

The parser 410 is configured to parse different data structures. Some of these data structures may include (1) SERP structures, (2) web crawler protocol files, or even (3) the search engine indexes described earlier. By parsing these structures, the parser 410 is able to generate a new list of links in an effort to improve the user's browsing experience.

The parser 410 also includes functionality to act as a multi-phase competing engine. As a result, the parser 410 is able to modify a search result listing (e.g., a SERP). This search result listing includes links that, when selected, direct a user to a corresponding webpage. Here, it is worthwhile to note that the parser 410 is able to implement a set of rules to modify the search result listing. Application of this set of rules causes the search results to be prioritized based on real-time conditions that impact the current accessibility of a webpage at the moment when the search engine generates its SERP. After the parser 410 receives the search engine's SERP, the parser 410 evaluates the rules against the SERP to thereby create a new list of links. Stated differently, when the rules are evaluated against the SERP, each corresponding webpage in the SERP is caused to be engaged in a competition to see which webpage has the best real-time conditions. Because the rules cause the links to be prioritized based on the real-time conditions, the new list of links is also based on these conditions. Accordingly, using the set of rules, the browser system 400 is able to regulate page position rank and discontinuity in real-time. In other words, the webpages compete with each other to determine which webpage is the best (i.e. is the most accessible in real-time), and the criteria for determining which webpage is the best is based on the particular set of rules, which prioritize search results based at least partially on real-time conditions.

To further clarify, when the rules are evaluated against the list of search results, the following actions occur (described at a high level). Initially, the embodiments determine each of the webpages' access performance rates. These rates are focused on information such as a current accessibility of the webpage, a current tower usage, a current network congestion, as well as the other factors that are discussed throughout this disclosure (these are but a few, the disclosure discusses many other factors that are included in the access performance rates). Once this information is acquired, then the set of rules are evaluated against the list of search results. Notably, the set of rules are dynamic and adjustable. To clarify, during some searches, one or more particular factors may be heavily emphasized by the set of rules (e.g., a current tower congestion may be particularly important for a first search) while during other searches, different factors may be emphasized (e.g., a webpage's current accessibility may be particularly important for a second search). Regardless of which factors are emphasized (the factors are defined and given a particular emphasis by the set of rules), the rules are then evaluated against the list of search result. During this evaluation, each webpage's access performance rates are measured against the factors/criteria mandated by the set of rules. By evaluating the set of rules against the webpages' access performance rates, the embodiments are able to determine which webpages' access performance rates most closely align with the factors outlined by the set of rules. These webpages are also organized based on relevancy (e.g., those webpages that most closely align with the factors outlined by the set of rules are at the top of a new list and are followed by webpages that do not as closely align with the factors in a progressive ranking manner). Notably, the embodiments do not simply place the fastest webpage at the top of the list. Indeed, the embodiments also ensure that the webpages are also highly relevant to the user's search terms. As a result, webpages that are highly relevant and that have the best access performance rates are given the highest priority.

Returning to FIG. 4, the browser 420 is configured as an application that accepts user input and that displays output corresponding to the user input (e.g., the application may be the user interface 200 of FIG. 2 and/or the user interfaces in FIGS. 3A and 3B). The browser 420 is also configured to interface with the other system components and remote systems to perform much of the functionality described herein.

Accordingly, the browser system 400 is able to use a set of rules to optimize a search result listing. Because some links may not be included in the new list, some embodiments are able to notify those absent webpages/hosts. In other words, these embodiments are able to notify a host when its priority is bumped downward. This notification can include a plethora of information. For instance, the notification can include the host's previous ranking/priority as well as the host's new ranking (after evaluation of the set of rules). Further, the notification can include a reason as to why the host was bumped down. One example of such a reason can be an indication that the webpage was slow, delayed, or inaccessible at the time when the SERP was initially generated. Additionally, the notification can include a timestamp indicating when the bump occurred. By providing this information, the host is able to identify deficiencies and seek to rectify those deficiencies. By fixing any such problems, then the host may be able to improve its priority when a subsequent search is performed.

While the above disclosure focused on an instance in which a notification was provided to a host whose ranking was bumped down, some embodiments will also provide a notification to a host whose rank was bumped up. As a result, the now-higher-ranked host is able to learn which factors contribute to improving its ranking in the search results. Accordingly, the present embodiments help facilitate a large-scale, or rather overall, improvement in web searching technology.

As discussed, the set of rules prioritizes search results based on real-time conditions. Some of the real-time (i.e. contemporaneous with when the search was executed) conditions include a current load or access speed of a webpage. As a result, fast loading webpages may be rewarded with improved ranking in the search results while slower webpages may be penalized. To clarify, while the search engine's SERP might have originally given a particular webpage a first ranking, the current embodiments may thereafter reward a webpage (e.g., by giving it a higher ranking after the set of rules are evaluated) if that webpage is determined to have a comparatively faster load speed (when compared to other webpages included within the SERP).

Accordingly, although there are many reasons as to why a network performance might be slow, the current embodiments are able to reward webpages that can still perform in even these less-than-optimal network conditions.

Figure 6:
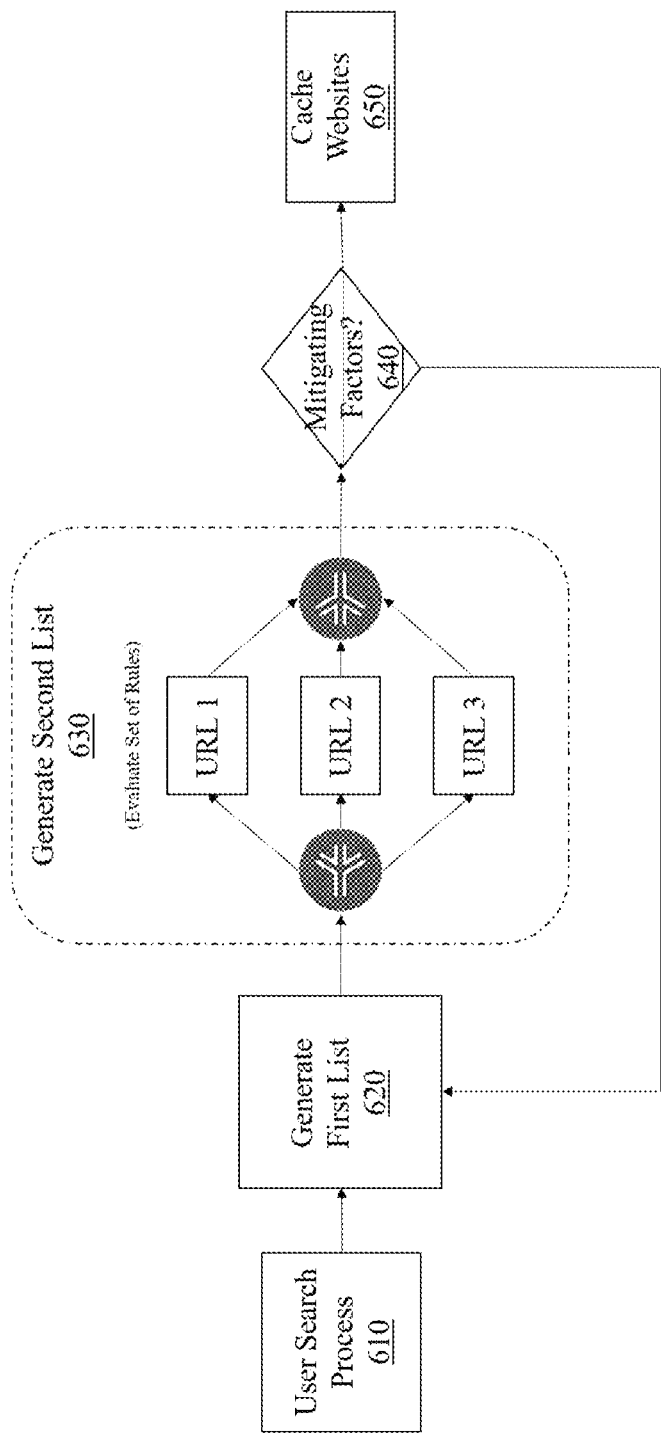
FIG. 6 illustrates a generalized flow diagram for optimizing a search result listing.

Attention will now be directed to FIG. 6. FIG. 6 shows a high-level flow diagram of a process that may be performed to optimize a search result listing using a particular set of rules. As shown, the flow diagram first shows that a user commences a search process 610. This search process 610 begins by a user entering one or more search terms into a search browser. As discussed earlier, after the user executes the search, then the search terms are delivered to a search engine (e.g., Google, Yahoo, Bing, etc.) which then scours the Internet in search of webpages that include content relevant to the user's search terms. Subsequently, the search engine generates a SERP. Stated differently, a first list of search results is generated (shown as step 620). As described earlier, the search engine uses its own set of rules to determine which webpages are relevant to the user's search terms (i.e. the search engine ranks the webpages according to a particular order). The first list of search results (i.e. the search engine's SERP) may include 0, 1, 2, or any number of search results.

The flow diagram of FIG. 6 then shows that a second list of search results is generated (step 630). Notably, this second list of search results is generated by evaluating the first list against a set of rules. As discussed earlier, this set of rules causes the webpages to be further prioritized by employing the real-time conditions of the webpages that were included in the first list. Stated differently, application of the set of rules causes the search results to be prioritized, this prioritization is based on the real-time conditions of at least some of the webpages that were included in the first list (i.e. the search engine's SERP). Some of the real-time conditions employed by the set of rules include a current status of a webpage, how fast the webpage can be currently accessed, how long it will take for the webpage to open if it were to be opened right now, etc. Additional factors that may be included within the set of rules include current network congestion, current network throttling, current signal strength, current device location, current cell phone tower capacity, and even current host capabilities. The set of rules causes the search results to be prioritized based on this acquired information (i.e. the webpages' access performance rates) to thereby re-prioritize the acquired set of search results. By evaluating the set of rules against the set of search results, each search result is forced to compete with the other results (i.e. a "page compete" process).

In some embodiments, determining these real-time conditions (i.e. the access performance rates) involves the use of a timing mechanism or algorithm. To clarify, the embodiments are able to use the timing mechanism or algorithm to track and further learn about each webpage's real-time conditions (i.e. the access performance rates). Using these mechanisms, the embodiments are then able to determine which webpage best meets the factors/criteria required by the set of rules.

As indicated, the set of rules includes an adaptable, or rather adjustable, list of factors that are considered important in determining how search results are to be ranked. Some of these factors include a corresponding webpage's response performance (e.g., response order/timing, page loading expense, page size, scripts, host speed, etc.). The embodiments evaluate the set of rules against the first list to determine which webpage (i.e. URL resource) will be rendered in a viewport first (i.e. which webpage was given the highest priority). Priority ordering for the other resulting webpages is also determined according to the set of rules, which may be based on the detected and relative response performance of the different webpages. As will be discussed later, the factors in the set of rules may change or their level of emphasis might change. Here, a brief example will be helpful. Suppose a first search is executed. During this first search, the set of rules used three factors (e.g., current access speed, current tower congestion, and current network connectivity) to prioritize the set of rules. Further, these three factors were also given a relevance or weight. For instance, in this example, the current access speed might have been the most important factor for consideration while the other two factors were merely secondary considerations. Now, suppose a second search is executed. In contrast to the first search, the set of rules has been modified. For instance, now the set of rules might include four factors, and all four of those factors are given equal relevance or weight. Accordingly, it will be appreciated that the set of rules can include different factors at different times and can emphasize those different factors in a different manner.

Here, another example will be helpful. FIG. 6 shows that a first list of links has been generated in step 620. In this example, the first list includes three URLs, namely URL 1, URL 2, and URL 3. The embodiments then examine these URLs (and their corresponding webpages) to determine the real-time conditions/status of these webpages. A set of rules is then evaluated against the first list. By evaluating the set of rules against the first list, a new list will be created (step 630). Notably, the links in this new list are prioritized according to the set of rules. As a result, the links might be in a different order (or some might even be removed) than an order of the links in the first list.

Continuing with the flow diagram, the embodiments consider whether any mitigating circumstances or factors 640 exist. One such example is related to a generalized network connectivity issue. If a user is on a mobile device, and the mobile device is in a poor reception area, then the mobile device might not be able to properly communicate with the Internet. When such an event occurs, all of the webpages will likely be negatively impacted. This negative impact across all of the webpages may constitute a mitigating factor 640. When such a mitigating factor 640 exists, some embodiments allow the second list to be replaced by the first list. In other words, some embodiments will revert back to using the search engine's original SERP. Regardless of which list is used, at least some of the relevant webpages are then cached in memory (shown as step 650). This reversion is available so that webpages are not adversely ranked due to conditions beyond their own control.

Accordingly, the present embodiments employ a page compete process when generating the second list of links. To clarify, the browser system (e.g., the browser system 400 of FIG. 4) watches in real-time for which webpage (e.g., URL resource, host, or server) best meets the criteria outlined in the set of rules. Whichever webpage best conforms to that criteria thus wins the "page competition."

As discussed earlier, during the actual loading or caching of the webpages, the set of rules can be dynamically modified to more fully emphasize one or more factors that were not previously emphasized. The list can then be re-evaluated against the set of rules. Accordingly, the set of rules may be evaluated against the first list (or even subsequently generated lists that have already been subject to evaluation against the set of rules) multiple times. As a result, the priorities of the list can change multiple times based on updated factors (e.g., relative response performance metrics) determined by the system for the different webpages. Some embodiments may perform these multiple rule evaluation iterations to ensure fair competition between the resulting search results.

Accordingly, the embodiments give priority loading to the webpage responding best to the criteria established by the set of rules. In some instances, this criteria is based on the fastest response time. In other instances (as discussed earlier), this criteria is based on other real-time conditions at the exact moment of query. This approach contrasts with a static or non-dynamic webpage ranking scheme. A static rank is often determined by various search engine algorithms that attempt to determine webpage relevancy for a given query. Webpages are then analyzed and compiled into a rank based on a given statically-based formula and a static index is compiled or generated. A static index has no ability to take into account the constantly changing real-time network conditions that mobile device users often find themselves in. Further, since speed and performance is highly desirable on mobile devices, it is therefore the proposal of the present embodiments that real-time conditions (e.g., speed, performance, etc.) should be weighted and factored into a ranking score.

Figure 7:
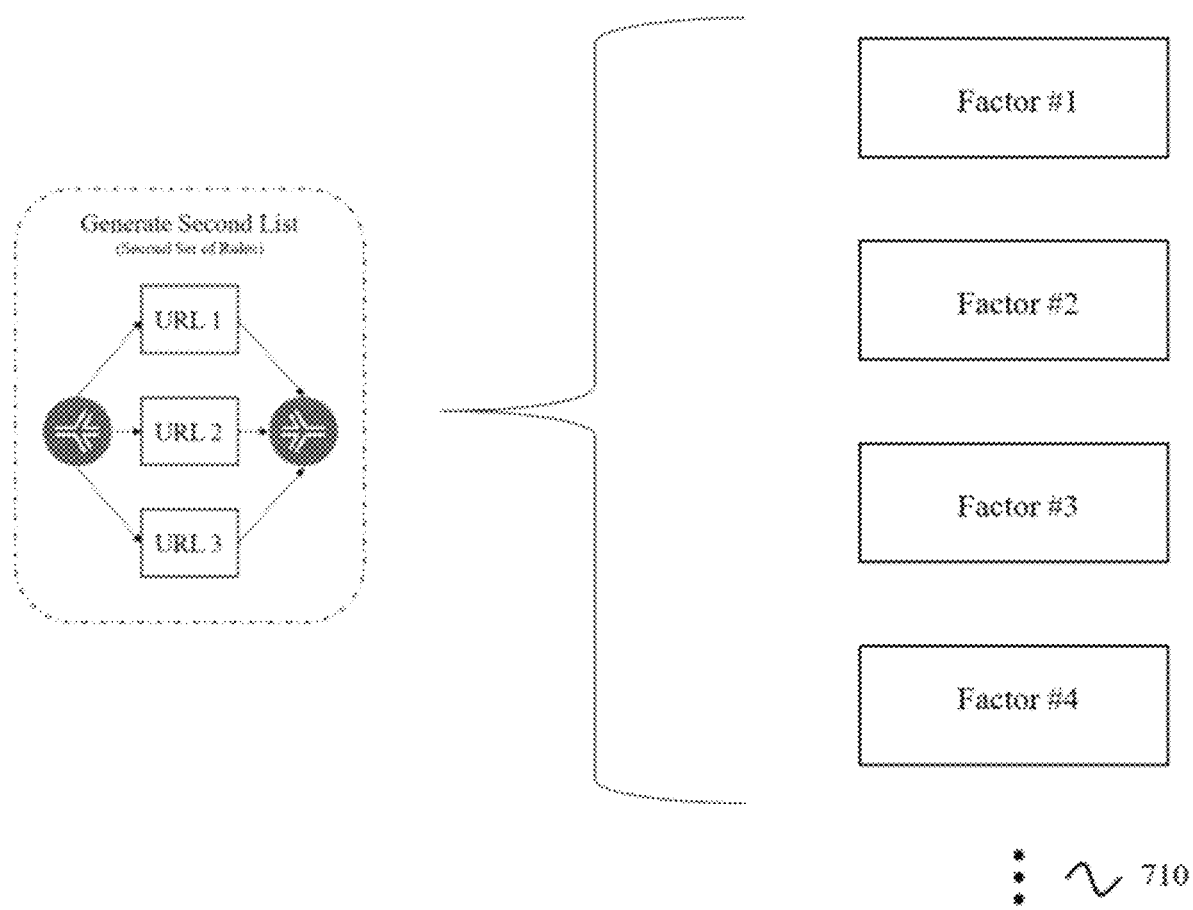
FIG. 7 illustrates some of the factors that are considered when optimizing a search result list.

FIG. 7 illustrates that many different factors (e.g., factor #1, factor #2, factor #3, factor #4, etc.) may be considered as part of the real-time conditions (i.e. access performance rates) of the set of rules. Although FIG. 7 illustrates only four different factors, the ellipses 710 demonstrates that many different factors may be employed. Some of the factors that can be included among the set of rules include the impact speed or response performance of the webpages in real-time at the exact moment of query from a mobile device. Additionally, other factors include: general mobile data signal strength, general Wi-Fi data signal strength, dynamic weather conditions of a device user (storm, cloud cover, etc.), a device location (e.g., is the device entering a tunnel or parking garage). In some instances, one or more of the factors may be given a higher relevance or weight than other factors. For instance, for a first search, determining which server may have responded fast at the time of the crawl (when ranked by a search engine) but may not be responding fast at the time of the exact mobile query may be ranked higher than a different factor (e.g., current network congestion). Still further factors include (due to changes in the network traffic) changes made to the webpage, a data-center power outage, data-center networking issues, a load-balancing handoff, security/authentication issues, etc. Other factors can affect a speed in which a page can load on a client device, such as programming languages and scripts used to render the webpages, functionality of embedded animations and links, device rendering capabilities and compatibilities, etc.

As discussed earlier, some embodiments allow a user to control which combination of factors is most important to include in the set of rules. For example, some users may desire to reduce the amount of data their mobile device consumes because data can be expensive. As a result, these users may adjust the set of rules so that data expenditure becomes a more influential factor than load speed.

In some instances, a user can also designate additional factors to consider or weight in the set of rules, so as to preferentially favor or disfavor certain domains/sites. For instance, if certain sites are very lightweight and always load the fastest (e.g., Wikipedia), the system can flag and automatically and/or manually assign weights to those sites to handicap them in the performance access rates, so that those sites do not always win the access performance battle. The amount of weighting may be predetermined and/or dynamically modified based on user preferences and/or machine learning through iterative analysis of which sites/domains win responsiveness compete contests a disproportionate amount of the time.

In some instances, a user can also identify one or more sites/domains that he/she wants to give preference to and/or to always include in the top "n" number of sites that will be included in the pre-cached/loaded pages available for display in the viewport/tab s.

Likewise, a user can also modify the set of rules so that evaluation of the rules will result only in a predetermined number of sites to include in the resulting list. The predetermined number can also include the sites/domains identified from the user as mandatory sites to always include (e.g., CNN, ESPN) if they have a relevant hit in the result page(s).

Different protocols may be used to identify response performance for the search results, when that is a selected factor. For instance, the World Wide Web utilizes a transport protocol known as HTTP or HTTPS. Accordingly, the embodiments are configured to take into account the differences in protocols for the different search results.

The search results may be queried at any time to update out-of-date status information. For instance, at the time a given search engine crawled a given page, a search result for that webpage might have been ranked highly in the search engine index. However, the corresponding webpage's status may have changed by the time a user requests the same resource on a mobile device and thus may no longer be available at the exact moment of query. By using the principles described herein, that webpage's priority will now be bumped down to reflect its current unavailability or slowness.

Rather than just checking for protocols (e.g., HTTP responses), in some instances, the embodiments may additionally or alternatively check the HTML DOM readyState property, to identify performance of the different webpages. The results/states of the readyState property may reflect five different values/states, including uninitialized (i.e. the page has not started loading), loading (i.e. the page is loading), loaded (i.e. the page is loaded), interactive (i.e. the page has loaded enough that the user can interact with it) and complete (i.e. the page is fully loaded).

For iOS, code can be injected directly into the DOM to check on the readyState properties and to provide the status feedback, without requiring a direct query. However, it is not necessary to inject code into the OS for all systems and embodiments. Instead, APIs can be used to access and obtain the different readyState properties at any desired triggering event or frequency.

Regardless of how the readyState information is obtained (e.g., code inserted into the DOM and/or with an API), it is possible to obtain the readyState information in real-time. This information, combined with the HTTP responses (if desired) can provide a very robust and reliable view into which of the different pages are most responsive and the fastest loading, regardless of the conditions that are causing irregular or slow loading.

As discussed above, there are innumerable causes of webpage outages including but not limited to hacker attacks, viral traffic, server overload, shared server resources, deliberate DDOS attacks, code-level mistakes, natural disasters affecting a data-center, scheduled server maintenance by a web host, domain expiration, power failures, general hardware malfunctions, DNS issues.

The disclosed embodiments, therefore, provide techniques for dynamically addressing these factors in the search result rankings presented to the user, in real-time, such that the ordered listing may vary from one moment to the next, based on dynamic changes in the factors affecting immediate/current page accessibility/loading speed.

Attention will now be directed to FIG. 8. In particular, this figure shows a first list 810 and a second list 820. This first list 810 includes at least five separate links. Notably, this first list 810 may be a search engine's SERP. Accordingly, using the principles described in this disclosure, when the set of rules are evaluated against the first list 810, the second list 820 will be generated. As shown, the number and ordering of the links in the second list 820 is different than the number and ordering of the first list 810. In particular, the second list 820 was generated by evaluating a set of rules in order to compile a list of links that takes into account various real-time conditions of webpages that correspond to the links in the first list 810. The links of the second list 820 are prioritized according to the second set of rules, which prioritizing causes the links to be at least partially organized according to the various real-time factors emphasized by the rules.

The present embodiments provide a better and more effective way to rank and reward fast performing web sites. More particularly, the disclosed ranking system considers, in real-time, any combination of cellular, LAN, or WAN network conditions, web server and data-center conditions, and/or webpage conditions associated with accessing and displaying ranked web pages.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. The methods are implemented by one or more processors of a computer system (e.g., the computer system 100 of FIG. 1). By way of example, a computer system includes one or more computer-readable hardware storage media that store computer-executable code/instructions. This computer-executable code is executable by the one or more processors to cause the computer system to perform these methods.

Exemplary Methods

FIG. 9 illustrates an exemplary method for implementing a particular set of rules in order to optimize a search result listing.

Specifically, method 900 includes an act (act 910) of receiving a query from a user who is using the computer system's user interface. This query includes a request to access digital content. In some instances, the digital content is online webpage content. This act may be performed by the browser 420 of the browser system 400 shown in FIG. 4.

The method 900 also includes an act (act 920) of obtaining a set of query results that includes a first list of selectable links. Each of these selectable links is associated with the digital content requested by the query and is prioritized according to a particular order. This act may be performed by the browser 420 of the browser system 400.

In some instances, the first list of selectable links may be a search engine results page (SERP). Additionally, in some embodiments, the obtained set of query results, which includes the first list of selectable links, is hidden from the user.

Method 900 also includes an act (act 930) of determining an access performance rate for each of at least some of the selectable links included within the first list. This act may be performed by the parser 410 of the browser system 400.

In some instances, the access performance rate corresponds to a load rate of the online webpage content. As discussed earlier, this load rate is determined in real-time such that the load rate is determined substantially contemporaneously with the obtaining of the set of query results.

Next, method 900 includes an act (act 940) of generating a second list of selectable links by evaluating the selectable links included within the first list against a set of rules. Application of this set of rules causes the links in the second list to be prioritized based at least partially on the determined access performance rates. This act may be performed by the parser 410 of the browser system 400.

In some embodiments, application of the set of rules causes data (e.g., the webpages) to be prioritized based on a fastest load speed. As a result, when the selectable links that are included within the first list are evaluated against the set of rules, each of the selectable links in the second list become prioritized based on which corresponding webpages have the fastest loading speed. Accordingly, webpages (and thus their corresponding links) that have comparatively faster load speeds are prioritized higher than webpages/links having comparatively slower load speeds.

In other embodiments, because of the application of the set of rules, the second list of selectable links will include fewer links than the first list of selectable links. Still further, the ordering of the second list of selectable links might be different than the ordering of the first list of selectable links.

Finally, method 900 includes an act (act 950) of updating the user interface to reflect the second list of selectable links. This act may be performed by the browser 420 of the browser system 400.

When the digital content is online content and when the selectable links are hyperlinks, then some embodiments will update the user interface by either (1) rendering a set of selectable links on the user interface (e.g., some of the links that are included in the second list) or (2) automatically caching one or more webpages that correspond to the links in the second list. Furthermore, some embodiments will actually render at least one of the automatically cached webpages on the user interface.

In some embodiments, a response rate was previously determined for the selectable links included within the first list prior to obtaining the query results. Then, a different response rate is later determined for the selectable links included within the first list. To clarify, the links in the second list may have had their response rates calculated multiple times. The different response rate mentioned above is a part of the access performance rate and is different than the previously determined response rate.

When a network connection of the computer system causes an access delay for the selectable links included within the second list, then some embodiments will replace the second list with the first list. In other words, these embodiments revert back to using the original SERP, or web search results. When this occurs, then the user interface is updated to reflect the first list as opposed to reflecting the second list.

As indicated earlier, the first list may include a plurality of different links (e.g., a first link and a second link). Notably, some links might be prioritized higher than other links. By way of example, the first link might have a higher priority in the first list than the second link. However, after evaluating the links in the first list against the set of rules, the priorities of the links might change when they are included in the second list. For example, after the evaluation, the second link might be prioritized higher in the second list than the first link. Relatedly, some links might not even be included in the second list after the evaluation. For instance, after the evaluation, application of the set of rules might have caused the second link to not be included in the second list. As a result, the contents of the second list might be different than the contents of the first list (as demonstrated by FIG. 8).

The embodiments may employ smart selective practices in determining which links will be given priority in the list (i.e. in selecting which factors to emphasize in the set of rules). To clarify, the set of rules are generated in a manner so as to improve the user's browsing experience. One way to improve the user's browsing experience is to make sure that undesirable content (e.g., offensive or pornographic material) is not automatically displayed on the user's device. As a result, not only do the embodiments consider real-time metrics when using the set of rules to prioritize links but they also employ protective measures to ensure that the user's experience is a pleasant one. As a result, some embodiments will cause at least one link in the SERP to be omitted from the parsed/suppressed index. One or more links will be omitted, in some instances, in response to determining that the links are associated with undesired content or black listed domains/webpages.

In some instances, parsers filter the list of links to omit one or more of the search results from being loaded into memory as part of the suppressed index and/or from being displayed. In some instances, the filtering is used to filter/omit particular types of content from being loaded/displayed, such as pornographic or offensive content. The filtering may be done upfront, or may be based on black-listed URLs, on content descriptions, and/or dynamically upon or during the loading of the content into memory. For instance, the content may be examined during and after the loading of content into memory, based on further examination of content terms, image profiles, metadata, etc. Content that is determined to be offensive will trigger removing the corresponding search result from the suppressed list. In some instances, the search result remains in the suppressed list, but it is simply skipped during navigation. This may include preventing the undesired webpage links from being displayed in the navigation control panel. This type of filtering can be beneficial because it prevents a user from accidentally stumbling across content that they may not have desired to navigate to. This can also improve the computer's functionality by filtering/omitting results that are associated with malware and by preventing a user from unwittingly navigating to a webpage having associated malware that is detected during the parsing.

Once the suppressed index is built, the browser identifies a particular webpage identified in the search results, such as, for example, from the derived/suppressed index. Typically, the system identifies the first listed link. In other instances, when the suppressed index is configured to include the SERP as a first identified link, the browser may automatically identify and load the first link after the SERP. In some instances, the browser identifies and pre-caches a predetermined number of webpages, such as corresponding to each link displayed in the navigation control panel, or another quantity (e.g., 2, 3, 4, 5 or another quantity). The entire SERP may also be preloaded and cached, but hidden from view, until the user navigates to the SERP, as described above.

In some instances, the search results include multiple SERPs based on searches to multiple search engines and may even be filtered using the various pivot icons discussed earlier. In such instances, the derived and suppressed index may identify and list a plurality of webpages comprising the SERPs and then the browser, in such instances, may automatically render the first SERP as the identified webpage, as generally described above.

FIG. 10 illustrates another exemplary method (method 1000) that is implemented by a computer system (e.g., computer system 100 of FIG. 1).

Here, method 1000 includes an act (act 1010) of displaying a first webpage on the user interface. This act may be performed by the browser 420 of the browser system 400.

The next illustrated act is an act (act 1020) of receiving a swipe gesture at the user interface. This act may be performed by the browser 420 of the browser system 400.

Next, the method 1000 includes an act (act 1030) of causing the first webpage to be replaced by user-directed content as a result of the swipe gesture. This act may be performed by a combination of the parser 410 and the browser 420 of the browser system 400. As indicated earlier in this disclosure, the user interface is able to automatically display webpages after a search is executed. To transition from one webpage to another, the user can execute a swipe command. As a result, instead of displaying a list of links, the current embodiments automatically open and display a webpage after a search is executed. Determining which webpage to display is based on the principles described earlier in which a list is prioritized according to a set of rules. Further, the user can switch between the webpages indicated by the list by executing the swipe command. In some embodiments, the user-directed content may be (1) advertisements, (2) the original SERP, (3) the second list of links, or (4) any other content that may be important for the user to view.

Finally, method 1000 includes an act (act 1040) of causing the user-directed content to be replaced by a second webpage in response to a second swipe gesture. This act may be performed by a combination of the parser 410 and the browser 420 of the browser system 400. As a result, the user-directed content is interleaved in a transitional flow of webpages, which transitional flow is based on an ordering of the selectable links included within the second list. To clarify, as discussed above, instead of presenting a list of hyperlinks to the user, the current embodiments generate a list and then automatically open and display a first webpage the corresponds to a first link in the list. In order to view other webpages from the list, the user simply performs a swipe action. As a result, the user can transition from one webpage to another using the swipe action. Such transitions constitute a flow from one webpage to another webpage. In these embodiments, the user-directed content can be injected between, or rather interleaved between, the displaying of the various webpages of the list. These interjections may be strategically placed so as to ensure that the user will view the user-directed content. To clarify, earlier it was mentioned that most users spend their time focused only on the first few search results. To ensure that the user will view the user-directed content, this content can be interleaved between the first and second webpages or between the second and third webpages. Regardless of where it is actually placed, the present embodiments employ smart selective processes in placing the user-directed content.

FIG. 11 shows an actual example of the method 1000 presented in FIG. 10.

In particular, FIG. 11 shows three different states of a user interface. At a first point in time (i.e. the left-most illustration), the user interface is displaying a webpage that corresponds to link 1. During this time, a user performs a swipe gesture 1120. As a result of the swipe gesture 1120, the user interface is now caused to display user-directed content (i.e. the middle illustration in FIG. 11). Then, in response to another swipe gesture 1140, the user interface displays a webpage corresponding to link 2 (i.e. the right-most illustration). As a result, user-directed content may be interleaved between the display of webpages, which webpages correspond to links of a list that has been optimized through the evaluation of a set of rules. In some embodiments, the user-directed content may be organized in a format similar to traditional webpages such that the user is not aware that he/she is viewing user-directed content (e.g., an advertisement) as opposed to a traditional webpage.

Accordingly, the present embodiments provide significant advantages over the current technology by considering real-time conditions when presenting a list of search results to a user.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions, the computer-executable instructions being executable by the one or more processors to cause the computer system to implement a particularized set of rules to optimize a search result listing by causing the computer system to:
   receive, at a user interface of the computer system, a query from a user who is using the computer system's user interface, the query including a request to access digital content;

obtain a set of query results, the set of query results including a first list of selectable links, wherein the selectable links included within the first list are each (1) associated with the digital content requested by the query and (2) prioritized according to a particular order;

determine an access performance rate for each of at least some of the selectable links included within the first list;

generate a second list of selectable links by evaluating the selectable links included within the first list against a set of rules, the set of rules being used to prioritize each link in the second list based at least partially on the determined access performance rates of the least some of the selectable links;

in response to determining a particular selectable link was re-ranked from being at a first position in the first list to being at a second position in the second list, which second position is either an upward bumped position or a downward bumped position relative to the first position, generate a notification comprising information detailing a reason as to why the particular selectable link's second position was either bumped upward or bumped downward in position relative to the first position;

provide the notification to a host of the particular selectable link to facilitate the host in determining reasons as to why rankings change; and update the user interface to reflect the second list of selectable links.

2. The computer system of claim 1, wherein the digital content is online webpage content, and wherein each of the one or more selectable links included within the second list is a hyperlink which, when selected, directs the user to a corresponding webpage.

3. The computer system of claim 2, wherein the access performance rate corresponds to a load rate of the online webpage content.

4. The computer system of claim 3, wherein the load rate is determined in real-time such that the load rate is determined substantially contemporaneously with the obtaining of the set of query results.

5. The computer system of claim 1, wherein application of the set of rules causes data to be prioritized based on a fastest load speed such that evaluating the selectable links included within the first list against the set of rules causes each selectable link included within the second list to be prioritized based on fastest load speed, whereby selectable links having comparatively faster load speeds are prioritized higher than selectable links having comparatively slower load speeds.

6. The computer system of claim 1, wherein each of the one or more selectable links included within the second list is a hyperlink to a corresponding webpage, wherein updating the user interface to reflect the second list is performed by automatically caching a first webpage and a second webpage, the first webpage corresponding to a first link in the second list and the second webpage corresponding to a second link in the second list, the second link immediately following the first link in the second list, and wherein execution of the computer-executable instructions further causes the computer system to:

display the first webpage on the user interface;

receive a swipe gesture at the user interface;

in response to the swipe gesture, cause the first webpage to be replaced by user-directed content such that the user-directed content appears on the user interface; and in response to a second swipe gesture, cause the user-directed content to be replaced by the second webpage such that the second webpage appears on the user interface, whereby user-directed content is interleaved in a transitional flow of webpages, which transitional flow of webpages is based on an ordering of the selectable links included within the second list.

7. The computer system of claim 1, wherein the first list of selectable links is a search engine results page (SERP).

8. The computer system of claim 1, wherein the second list of selectable links includes fewer links than the first list of selectable links, and wherein an ordering of the second list of selectable links is different than an ordering of the first list of selectable links.

9. The computer system of claim 1, wherein the digital content is online webpage content, wherein each of the one or more selectable links included within the second list is a hyperlink, and wherein updating the user interface to reflect the second list of selectable links is performed by either:

rendering a set of selectable links on the user interface, the set of selectable links being links that are included within the second list or automatically caching one or more webpages, the one or more webpages corresponding to at least one selectable link included within the second list.

10. The computer system of claim 1, wherein:

the digital content is online webpage content, each of the one or more selectable links included within the second list is a hyperlink, updating the user interface to reflect the second list of selectable links is performed by automatically caching one or more webpages, the one or more webpages corresponding to at least one selectable link included within the second list, and at least one of the automatically cached one or more webpages is rendered on the user interface.

11. One or more hardware storage devices having stored thereon computer-executable instructions, the computer-executable instructions being executable by one or more processors of a computer system to cause the computer system to implement a particularized set of rules to optimize a search result listing by causing the computer system to:

receive, at a user interface of the computer system, a query from a user who is using the computer system's user interface, the query including a request to access digital content;

obtain a set of query results, the set of query results including a first list of selectable links, wherein the selectable links included within the first list are each (1) associated with the digital content requested by the query and (2) prioritized according to a particular order;

determine an access performance rate for each of at least some of the selectable links included within the first list;

generate a second list of selectable links by evaluating the selectable links included within the first list against a set of rules, the set of rules being used to prioritize each link in the second list based at least partially on the determined access performance rates of the least some of the selectable links;

in response to determining a particular selectable link was re-ranked from being at a first position in the first list to being at a second position in the second list, which second position is either an upward bumped position or a downward bumped position relative to the first position, generate a notification comprising information detailing a reason as to why the particular selectable link's second position was either bumped upward or bumped downward in position relative to the first position;

provide the notification to a host of the particular selectable link to facilitate the host in determining reasons as to why rankings change; and update the user interface to reflect the second list of selectable links.

12. The one or more hardware storage devices of claim 11, wherein the obtained set of query results, which includes the first list of selectable links, is hidden from the user.

13. The one or more hardware storage devices of claim 11, wherein, prior to obtaining the query results, a response rate was previously determined for the selectable links included within the first list, and wherein a different response rate is determined for the selectable links included within the second list, the different response rate being different than the previously determined response rate, the different response rate being a part of the access performance rate.

14. The one or more hardware storage devices of claim 11, wherein, when a network connection of the computer system causes an access delay for the selectable links included within the second list, the second list is replaced by the first list and the user interface is updated to reflect the first list as opposed to reflecting the second list.

15. The one or more hardware storage devices of claim 11, wherein the digital content is online webpage content, wherein each of the one or more selectable links included within the second list is a hyperlink, and wherein updating the user interface to reflect the second list is performed by rendering one or one or more selectable links included within the second list on the user interface.

16. The one or more hardware storage devices of claim 11, wherein the digital content is online webpage content, wherein each of the one or more selectable links included within the second list is a hyperlink, wherein updating the user interface to reflect the second list is performed by automatically caching one or more webpages, the one or more webpages corresponding to at least one selectable link included within the second list, and wherein at least one of the automatically cached one or more webpages is loaded and displayed on the user interface.

17. A method for optimizing a search result listing, the method being performed by one or more processors of a computer system, the method comprising:

receiving, at a user interface of the computer system, a query from a user who is using the computer system's user interface, the query including a request to access digital content;

obtaining a set of query results, the set of query results including a first list of selectable links, wherein the selectable links included within the first list are each (1) associated with the digital content requested by the query and (2) prioritized according to a particular order;

determining an access performance rate for each of at least some of the selectable links included within the first list;

generating a second list of selectable links by evaluating the selectable links included within the first list against a set of rules, the set of rules being used to prioritize each link in the second list based at least partially on the determined access performance rates of the least some of the selectable links;

in response to determining a particular selectable link was re-ranked from being at a first position in the first list to being at a second position in the second list, which second position is either an upward bumped position or a downward bumped position relative to the first position, generating a notification comprising information detailing a reason as to why the particular selectable link's second position was either bumped upward or bumped downward in position relative to the first position;

providing the notification to a host of the particular selectable link to facilitate the host in determining reasons as to why rankings change; and updating the user interface to reflect the second list of selectable links.

18. The method of claim 17, wherein the first list includes a first link and a second link, the first link being prioritized higher in the first list than the second link.

19. The method of claim 18, wherein evaluating the selectable links included within the first list against the set of rules causes the second link to not be included in the second list.

20. The method of claim 18, wherein the second list also includes the first link and the second link, the second link being prioritized higher in the second list of selectable links than the first link.

* * * * *